United States Patent [19]

Arzoumanidis et al.

[11] Patent Number: 4,540,679

[45] Date of Patent: Sep. 10, 1985

[54] MAGNESIUM HYDROCARBYL CARBONATE SUPPORTS

[75] Inventors: Gregory G. Arzoumanidis, Naperville; Sam S. Lee, Hoffman Estates, both of Ill.

[73] Assignee: Amoco Corporation, Chicago, Ill.

[21] Appl. No.: 592,910

[22] Filed: Mar. 23, 1984

[51] Int. Cl.$^3$ .............................. C08F 4/64; C08F 4/02
[52] U.S. Cl. .................................. 502/111; 502/104; 502/108; 502/125; 502/127; 502/133; 526/124
[58] Field of Search .............. 502/111, 133, 104, 125, 502/108, 127

[56] References Cited

U.S. PATENT DOCUMENTS

| | | | |
|---|---|---|---|
| 4,199,473 | 4/1980 | Timms | 502/111 X |
| 4,244,838 | 1/1981 | Gessell | 502/111 |
| 4,246,383 | 1/1981 | Gessell | 502/111 X |
| 4,277,370 | 7/1981 | Karayannis et al. | 502/108 X |

*Primary Examiner*—Patrick P. Garvin
*Attorney, Agent, or Firm*—William H. Magidson; William T. McClain; Ralph C. Medhurst

[57] ABSTRACT

Composition comprising a transition metal component and magnesium hydrocarbyl carbonate. Composition can be prepared by reacting suspension of magnesium alcoholate with carbon dioxide to form a magnesium hydrocarbyl carbonate and reacting magnesium hydrocarbyl carbonate with transition metal component. When the suspending liquid comprises an alcohol, the magnesium hydrocarbyl carbonate dissolves and is subsequently precipitated with an antisolvent comprising metal alkyl or transition metal halide. When the suspending liquid is substantially free of alcohol, the magnesium hydrocarbyl carbonate suspension is reacted with metal alkyl and transition metal compound.

32 Claims, No Drawings

MAGNESIUM HYDROCARBYL CARBONATE SUPPORTS

This invention relates to a composition comprising a transition metal component and a magnesium hydrocarbyl carbonate support. More particularly this invention relates to a composition comprising a titanium component and a support comprising the reaction product of carbon dioxide and a magnesium alcoholate.

It is well known that normally solid, high molecular weight, predominantly crystalline polymers of alpha-olefins such as ethylene, propylene, butene-1, etc. can be prepared using a catalyst comprising an organoaluminum compound and a transition metal compound. Among such catalysts, those wherein the transition metal compounds are supported on a catalytically inert material, such as a metal oxide support, have been found particularly advantageous in the polymerization of ethylene and copolymerization of ethylene-dominated mixtures of alpha-olefins. Typically, such catalysts exhibit higher activities, give higher polymer yields and make more efficient use of transition metal compounds than do catalysts containing unsupported transition metal compounds. Until recently, however, supported transition metal catalyst components have found little or no commercial use in the stereospecific polymerization of alpha-olefins of three or more carbon atoms. While commonly assigned Karayannis, U.S. Pat. No. 4,277,370, which is hereby incorporated by reference, discloses a new catalyst for the stereospecific polymerization of alpha-olefins of three or more carbon atoms comprising an organoaluminum compound and a component prepared from a halogen containing compound of titanium (IV), organic electron donor and a pretreatment product of components comprising magnesium alcoholate, etc., the catalyst resulting from this process, like most of the catalysts of this art, has the drawback that the particles are of different sizes and shapes, including particles of undesirably small dimension, e.g. fines. Catalyst fines are a particular problem since most supported catalyst components for vapor phase polymerization of $C_3$ or higher olefins are routinely abraded to provide the catalysts higher activity. When irregularly shaped catalysts are polymerized under vapor phase conditions, the resulting polymerizates assume the shape of the catalyst particles. Further, the polymerizates have an extremely broad particle distribution including a relatively high concentration of very small particles. Such polymerizates are less than ideal for further processing. Accordingly, there is a need for relatively uniform supported catalyst components. In addition to the foregoing, there is always a need for new catalyst components, particularly those of higher activity or capable of simpler production.

For the purposes of this invention, the term "magnesium hydrocarbyl carbonate" refers to the reaction product of carbon dioxide and a Mg (OR) (OR') wherein R and R' are the same or different hydrocarbyl groups. The "magnesium hydrocarbyl carbonates" are believed to have the structure

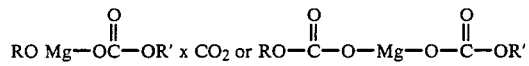

wherein R and R' are the same or different hydrocarbyl groups and X is a number.

The general object of this invention is to provide a new class of catalyst components or catalysts comprising a transition metal component and a magnesium support. Another object of this invention is to provide a new class of catalysts or catalyst components having a reduced level of fines. Other objects appear hereinafter.

The objects of this invention can be attained with a composition (catalyst component or catalyst) comprising a transition metal component and a magnesium hydrocarbyl carbonate support. Typically said support comprises the reaction product of carbon dioxide and a magnesium alcoholate of the formula Mg (OR) (OR') wherein R and R' are identical or different hydrocarbyl groups of 1 to 20 carbon atoms. Broadly, the magnesium hydrocarbyl carbonates of this invention can be prepared by reacting carbon dioxide with the magnesium alcoholate. For example, the magnesium hydrocarbyl carbonate support can be formed by suspending magnesium ethoxide in an alcohol medium, adding carbon dioxide until the magnesium ethoxide dissolves forming magnesium ethyl carbonate and precipitating the magnesium ethyl carbonate reaction product from the solution as discrete spheres and/or oblong particles by treating with anti-solvent, such as an alkyl aluminum compound or transition metal compound. If the magnesium ethoxide is suspended in a liquid hydrocarbon or halohydrocarbon, (free of alcohol) the addition of carbon dioxide results in the breaking apart of the magnesium ethoxide particles and the magnesium reaction product does not dissolve. In either case the magnesium support is relatively uniform, contains a relatively low level of fines and can be processed into an effective catalyst for the polymerization of olefins, particularly $C_3$ olefins without any need for ball milling. The alcoholic solution route tends to yield catalysts of lower activity and polymerizates of lower crystallinity as compared to those prepared by the suspension route. However, polymers prepared from catalyst supports prepared by the solution route have better morphology.

Briefly, the composition of this invention (catalyst component or catalyst) comprising a transition metal component and magnesium hydrocarbyl carbonate support can be prepared by reacting (1) at least one transition metal compound, preferably titanium (IV) halide with (2) a magnesium hydrocarbyl carbonate comprising the reaction product of carbon dioxide and at least one magnesium alcoholate. To form the supported catalyst, at least one Group II or IIIA metal alkyl is reacted with the transition metal reaction product of (1) and (2) or with the magnesium hydrocarbyl carbonate before the reaction of (1) and (2). Optionally the reaction product of (1) and (2) or the magnesium hydrocarbyl carbonate before or at the same time as the reaction of (1) and (2) can be treated with (a) at least one organic electron donor, (b) at least one modifier selected from the group consisting of mineral acids and anhydrides of sulfur, organochalcogenide derivatives of hydrogen sulfide, organic acids weaker than $H_2CO_3$, organic acid anhydrides and organic acid esters and/or (c) at least one chlorohydrocarbon and/or at least one silane.

Specific examples of magnesium alcoholates which are useful according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates also can be employed if desired. Additionally mixtures of magnesium alcoholates with other alkali earth metal alkoxides, alkali metal alkoxides, minor amounts of other suitable metal salts such as alcoholates of lanthanum and the lanthanide metals, magnesium halides, hydroxyhalides, carboxylates, and so forth can be used. Magnesium hydrocarbyl alcoholates are functional equivalents of the magnesium alcoholates when alcohol is used as the suspending medium for the reaction with carbon dioxide since the magnesium hydrocarbyl alcoholates are converted to $Mg(OR)(OR')$ in alcohol. In inert suspending medium the magnesium hydrocarbyl alcoholates are converted into magnesium hydrocarbyl carbonate salts on the addition of carbon dioxide. Spherical forms of magnesium alkoxides can be used, if desired, particularly when an alcoholic medium is not employed for the carbonation step.

From the standpoint of cost and availability, magnesium alcoholates which are preferred for use according to this invention are those of the formula $Mg(OR')_2$ wherein R' is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 6 to about 12 carbon atoms. Best results are attained through the use of magnesium ethoxide.

The alcohols useful for facilitating dissolution of the magnesium alcoholates or the addition of carbon dioxide include those having the structure HOR' wherein R' is as defined above for the magnesium alcoholates. Typically one or more alcohols containing from 1 to 12 carbon atoms can be used such as methanol, ethanol, propanol, isopropanol, tert-butyl alcohol, cyclohexanol, 2-ethylhexanol, dodecanol, etc. Of these ethanol is preferred, particularly when magnesium ethoxide is the magnesium alcoholate being processed.

Useful Group II and IIIA metal alkyls are compounds of the formula $MR^3{}_m$ wherein M is a Group II or IIIA metal, each $R^3$ is independently an alkyl radical of 1 to about 20 carbon carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

If desired, metal alkyls having one or more halogen or hydride groups can be employed, such as ethylaluminum dichloride, diethylaluminum chloride, ethylaluminum sesquichloride, diisobutylaluminum hydride, etc.

To maximize catalyst activity it is preferred to incorporate one or more modifiers, such as silanes, mineral acids weaker than $H_2CO_3$ organometallic chalcogenide derivatives of hydrogen sulfide, organic acids, organic acid esters, and mixtures thereof.

Specific examples of useful mineral acids and anhydrides of sulfur include sulfur dioxide. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide modifiers include bis(triphenyltin)sulfide, bis(tritolytin)sulfide, bis-(triethylphenyltin)sulfide, bis-(trihexylphenyltin)sulfide, bis-(triphenylmethyltin)sulfide, bis-(triphenylethyltin)sulfide, bis-(triphenylhexyltin)sulfide, bis-(trimethyltin)sulfide, bis-(triethyltin)sulfide, bis-(tributyltin)sulfide, bis-(trihexyltin)sulfide, and similar silicon- and germanium-containing compounds.

Among the mineral acids and anhydrides of sulfur and organometallic chalcogenide derivatives, sulfuric acid, fuming sulfuric acid, chlorosulfonic acid, and hydrogen sulfide are preferred because they lead to the best overall improvements in activities and stereospecificities.

Suitable organic acids contain from 1 to about 20 carbon atoms and 1 to about 4 carboxyl groups. Such acids include aliphatic acids of 1 to about 20 carbon atoms; halogen-, hydroxyl-,oxo-, alkyl-, alkoxy-, aryl-, and/or arloxy-substituted aliphatic acids of 1 to about 20 carbon atoms, aromatic acids of 7 to about 14 carbon atoms; and halogen-, hydroxyl-, alkyl-, alkoxy-, aryl-, and/or aryloxy-substituted aromatic acids of 7 to about 20 carbon atoms. The polycarboxylic acids are preferred, particularly aromatic polycarboxylic acids having acid groups ortho to each other.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids, substituted aromatic acids and anhydrides include benzoic acid, phthalic acid, phthalic anhydride trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acids, veratric acid, asaronic acid, ethoxybenzoic acids, piperonylic acids, vanillic acid, cresotic acid, and everninic acid.

Suitable organic acid esters include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromomethyl, butyl, isobutyl, hexyl, cyclohexyl, octyl, chlorododecyl, phenyl, chlorophenyl, and naphthyl esters of acids such as are named above.

Preferred organic acids and esters are benzoic acid, halobenzoic acids, phthalic acid, isophathalic acid, terephthalic acid and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, and diisobutyl phthalate as these give good results in terms of activity and stereospecificity and are convenient to use.

Suitable transition metal compounds which can be used in this invention include compounds represented by the formula $T_aY_bX_{c-b}$ wherein $T_a$ is a transition metal selected from Groups IV-B, V-B and VI-B of the Periodic Table of Elements, Y is oxygen, OR' or NR'$_2$; wherein each R' is independently hydrogen or hydrocarbyl group of 1 to 20 carbon atoms; X is a halogen, preferably chlorine or bromine; c has a value corresponding to the valence of the transition metal, $T_a$; b has a value of from 0 to 5 with a value of c-b being from at least 1 up to value of the valence state of the transition metal $T_a$.

Suitable transition metal compounds include, halide compounds of titanium, zirconium, vanadium and chromium, such as chromyl chloride, vanadium oxytrichloride, zirconium tetrachloride, vanadium tetrachloride etc.

Titanium (IV) compounds useful in preparation of the stereospecific supported catalyst components of this invention are titanium halides and haloalcoholates having 1 to about 20 carbon atoms per alcoholate group such as methoxy, ethoxy, butoxy, hexoxy, phenoxy, decoxy, napthoxy, dodecoxy and eicosoxy. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and sterospecificity. If desired, stable tetrahydrocarbyl titanium compounds, such as $Ti(benzyl)_4$, can be used.

Organic electron donors useful in preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such a methanethiol, ethanethiol, ethanedithiol, propanethiols, butanethiols, butanedithiols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$-$C_6$ alkyl esters of aromatic carboxylic acids and halogen-, hydroxyl-, oxo-, alkyl, alkoxy-, aryl-, and/or aryloxy-substituted aromatic monocarboxylic acids. Among these, the alkyl esters of benzoic, halobenzoic, phthalic, terephthalic and isophthalic acids wherein the alkyl group contains 1 to about 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

Diluents suitable for use in the carbonation of dispersion of magnesium alcoholates or for facilitating the reaction of aluminum alkyls or transition metal halides with the hydrocarbyl magnesium carbonates include hydrocarbons and halogenated derivatives thereof that are substantially inert to the reactants employed and, preferably, are liquid at the temperatures of use. It also is contemplated to conduct the reaction at elevated pressure so that lower-boiling diluents can be used even at higher temperatures. Examples of useful diluents include alkanes such as hexane, cyclohexane, ethylcyclohexane, heptane, octane, nonane, decane, undecane, and so forth; haloalkanes such as 1,1,2-trichloroethane carbon tetrachloride etc. aromatics such as xylenes and ethylbenzene; and halogenated and hydrogenated aromatics such as chlorobenzene, o-dichlorobenzene, tetrahydronaphthalene and decahydronaphthalene. Chlorobenzene is preferred since it facilitates the formation of a colloidal magnesium hydrocarbyl carbonate of high activity and excellent morphology.

In somewhat greater detail, the magnesium hydrocarbyl carbonate support is prepared by suspending magnesium alcoholate in a suitable liquid (alcohol or mixtures of alcohol and inert liquid if the solution route is employed or inert hydrocarbon or halogenated hydrocarbon diluent substantially free of alcohol, if the suspension route is employed). In either case, approximately 10 to 80 parts by weight magnesium alcoholate is suspended per 100 parts by weight liquid. A sufficient amount of carbon dioxide is bubbled into the liquid suspension to provide from about 0.1 to 4 mols of carbon dioxide per mol of magnesium alcoholate with mild stirring.

In the solution route, approximately 0.3 to 4 mols of $CO_2$ are added to the suspension of magnesium alcoholate in alcohol with stirring at a temperature of about 0° to 100° C. over a period of approximately 10 minutes to 4 hours until the magnesium alcoholate dissolves in the alcoholic medium. The alcoholic magnesium hydrocarbyl carbonate solution can be added to the metal alkyl (e.g. aluminum alkyl) or transition metal halide or the metal alkyl or transition metal halide added to the magnesium hydrocarbyl carbonate solution. In either case the magnesium hydrocarbyl carbonate tends to precipitate out of the alcoholic medium as discrete spheres or as oblong particles. In those cases where the metal alkyl or transition metal halide is added to the dissolved magnesium hydrocarbyl carbonate, it is usually desirable to dilute the alcoholic magnesium hydrocarbyl carbonate solution with an inert hydrocarbon or halohydrocarbon. If the magnesium hydrocarbyl carbonate precipitates out on initially mixing with the inert hydrocarbon or halohydrocarbon, it redissolves as the concentration of hydrocarbon or halohydrocarbon in the system increases. Subsequently, upon the addition of metal alkyl or transition metal halide, the magnesium hydrocarbyl carbonate precipitates out as discrete spheres or oblong particles as it reacts with the metal alkyl or transition metal halide.

If metal alkyl is used to precipitate the magnesium hydrocarbyl carbonate, the support is contacted with transition metal halide to form magnesium hydrocarbyl carbonate supported transition metal component.

In those cases where the magnesium hydrocarbyl carbonate is produced in suspension, it is generally preferred to treat the suspension of magnesium alcoholate in an inert hydrocarbon or halogenated hydrocarbon diluent with sufficient metal alkyl to coact with substantially all of the alcohol impurities in the magnesium alcoholate. Approximately 0.3 to 4 mols of $CO_2$ are added to the suspension of magnesium alcoholate in the inert diluent with stirring at a temperature of about 0° to 100° C. for a period of approximately 10 to 48 hours until the average particle size of magnesium alcoholate decreases by at least 50%, preferably to less than one hundred microns. The hydrocarbon or halohydrocarbon suspension of magnesium hydrocarbyl carbonate can be added to metal alkyl or transition metal halide or the magnesium hydrocarbyl carbonate suspension can be added to metal alkyl or transition metal halide.

Irrespective of whether the solution or suspension route is employed, it is preferred that the transition metal compound, preferably titanium (IV) and magnesium hydrocarbyl carbonate are reacted with electron donor components. The electron donor compound and transition metal compound can be contacted together in the presence of an inert hydrocarbon or halogenated diluent with the magnesium hydrocarbyl carbonate although other suitable techniques can be employed. Suitable diluents are materials which are substantially inert to the component employed and are liquid at the temperature employed or can be maintained in the liquid state through the use of elevated pressure. As in the case of the diluents and alcohols employed in the formation of the magnesium hydrocarbyl carbonate it is desirable to purify any diluent to be employed to remove, water, oxygen, carbon monoxide and other extraneous catalyst poisons. In some cases it is desirable to react the electron donor with the reaction product of magnesium hydrocarbyl carbonate and transition metal compound. Reaction between the magnesium hydrocarbyl carbonate, transition metal component, preferably titanium (IV) and organic electron donor is carried out at temperatures ranging from about −10° C. to 170° C. Generally the reaction is carried out over a period of several minutes to several hours.

In preparation of the stereospecific supported catalyst components of this invention, the magnesium-containing product, transition metal component, and organic electron donor component are contacted in amounts such that the atomic ratio of transition metal to magnesium in the magnesium-containing component is at least about 0.5:1. Preferably, this ratio ranges from about 0.5:1 to about 20:1. Greater amounts of transition metal can be employed without adversely affecting catalyst component performance, but there typically is no need to exceed a transition metal to magnesium ratio of about 20:1 as only a portion of the transition metal is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up to about 1.0 mole per gram atom of transition metal, and preferably from about 0.001 to about 0.6 mole per gram atom of titanium. Best results are achieved when this ratio ranges from about 0.01 to about 0.3 mole per gram atom of titanium. The atomic ratio of metal in the Group II or IIIA metal alkyl component to metal in the magnesium hydrocarbyl carbonate component ranges from about 0.001:1 to about 1:1. Preferably, this ratio ranges from about 0.005:1 to about 0.5:1 to provide the best catalyst performance.

The above-described process is conducted in the substantial absence of water, oxygen, carbon monoxide, and other extraneous materials capable of adversely affecting the performance of the invented catalyst components. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or heating of reactant.

Although not required, the solid reaction product prepared as described herein can be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferably Lewis acids are $TiCl_4$ and $SiCl_4$. Mixtures of Lewis acids can be employed if desired.

Although not required, the above-described solid reaction product can be washed with an inert liquid hydrocarbon or halogenated hydrocarbon before contact with a Lewis acid. Suitable inert liquids include those identified hereinabove as pretreatment and preparative diluents.

In addition, the reaction mixture of magnesium hydrocarbyl carbonate and transition metal component can contain chlorocarbons and/or organo silanes. Chlorocarbon and/or organo chloro silane are advantageously present during the reaction of the transition metal component and magnesium hydrocarbyl carbonate to provide a better medium for the activation of the catalyst.

Suitable useful chlorocarbons contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,1,2-trichloroethane and pentachloroethane.

Haloalkylchlorosilanes useful in this invention include compounds with the formula

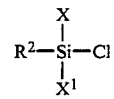

wherein R is a haloalkyl radical containing one to about ten carbon atoms or a halosilyl radical or haloalkylsilyl radical containing one to about eight carbon atoms, and X and $X^1$ are halogen, hydrogen, or alkyl or haloalkyl radicals containing one to about ten carbon atoms. Typically, R is a chloroalkyl radical containing one to about eight carbon atoms and one to about twelve chlorine atoms, and X is chlorine or a chloroalkyl radical containing one to four carbon atoms, and $X^1$ is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

The reaction mixture of magnesium hydrocarbyl carbonate and phthalate (acids, anhydride or esters) advantageous contains an aromatic silane modifier to provide a better medium for the activation of the catalyst. Suitable aromatic silanes have the structure:

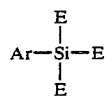

wherein Ar is an aryl group of 6 to 20 carbon atoms, such as phenyl, dodecylphenyl, cresyl, etc., each E is independently R' or OR' with R' having the notation above. The preferred aromatic silanes include diphenyl dimethoxy silane, phenyl trimethoxy silane phenyl ethyl dimethoxy silane and methyl phenyl dimethoxy silane.

Prior to use in the polymerization of alpha-olefins, the catalyst components can be further activated by comminution. Techniques of comminution by ball-milling generally are known in the art. Typically, catalyst component and hard, nonreactive balls, such as steel or carborundum balls, are placed in a closed container which is agitated usually by rolling, shaking or rocking. Such comminution is continued for a few hours up to several days, typically about 12 to about 36 hours, until the catalyst component is ground to a desired particle size typically about 5 to about 50 microns. Since mechanical action of comminution can cause a temperature increase in the comminuting mixture, care should be taken to keep the temperature below the decomposition temperature of the catalyst component. Typically, the comminuting mixture should be kept at below about 50° C.

Prepolymerization and encapsulation of the catalyst can also be carried out prior to polymerization.

The above-described catalysts are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The inverted catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerization conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure at the polymerization temperature of the alpha-olefin to be polymerized.

The polymerization time is not critical and will generally range from about ½ to several hours in batch processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use such as by distillation, percolation through molecular sieves, contacting with a compound such as an alkylaluminum compound capable of removing trace impurities, or by other suitable means. Examples of gas-phase polymerization processes in which the catalyst of this invention is useful are described in U.S. Pat. Nos. 3,957,448; 3,965,083; 3,971,768; 3,972,611; 4,129,701; 4,101,289; 3,652,527 and 4,003,712.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. The polymeric products produced in the presence of the invented catalysts can be fabricated into useful articles by extrusion, injection molding, and other common techniques.

The following examples illustrate but do not limit the described invention.

EXAMPLE I

Into a one-liter glass reactor equipped with magnetic stirrer was added 20 mg magnesium ethoxide and 90 ml ethanol (200 proof) under an argon atmosphere. While stirring at room temperature and 600 rpm, carbon dioxide was added until the pressure in the reactor reached 21 psig over a period of about 30 minutes during which time the magnesium ethyl carbonate dissolved. A mixture of 180 ml hexane and 120 ml decane was added to the reactor followed by dropwise addition of 450 ml of 25% by weight triethylaluminum in hexane at room temperature. A white precipitate formed during the triethylaluminum addition yielding spherical particles of 5 to 10 microns. The suspension was heated to 180° F. and maintained there for about 1½ hours, decanted and washed three times with 125 ml portions of dry n-hexane, transferred to a bottle and filtered in the dry box and dried.

Two hundred ml carbon tetrachloride and 200 ml trichloroethane were added to the one-liter glass reactor equipped as above while stirring at 450 rpm. Twenty grams of the dry magnesium ethylcarbonate prepared in the preceding paragraph was poured into the reactor with the aid of nitrogen pressure. Two hundred ml titanium tetrachloride was added dropwise over a 30 minute period followed by dropwise addition of 4 ml ethyl benzoate over a period of 15 minutes. The reaction product was heated to 200° F. and maintained for 1½ hours at 200° F. The suspension was then washed 3 times with 125 ml of hexane and dried under nitrogen.

The magnesium ethylcarbonate supported titanium which was prepared in the preceding paragraph was suspended in 200 ml carbon tetrachloride and 200 ml trichloroethane in a one-liter flask equipped as above and stirred at 450 rpm. Two hundred ml titaniumtetrachloride was added over a period of 15 minutes and 4 ml of ethyl benzoate over a period of 5 minutes. The temperature was increased to 200° F. and maintained there for 90 minutes. The product was washed 5 times and transferred to a bottle and filtered to a dry powder in a dry box. Magnesium ethylcarbonate supported titanium powder comprised spherical agglomerates of 50–70 microns.

The magnesium ethylcarbonate supported titanium catalyst component prepared in the preceding paragraphs was then used to polymerize 1300 ml propylene at a temperature of 160° F., 460 psig, 27 mmol hydrogen, for two hours using 10 mg of the magnesium ethylcarbonate supported titanium. The catalyst mixture was prepared in a 7 ml bomb by adding 2 ml hexane, 10 mg of the titanium supported magnesium ethylcarbonate prepared in the preceding paragraph, 0.33 ml of a 1:1 molar ratio of triethyl aluminum 2,2',6,6'-tetramethyl piperidine (TMPIP) mixture (1.32 m mol) and 0.9 ml methyl-p-toluate (0.2 mol sol) equal to 0.18 m mol. After the reactor was charged with 1000 ml propylene and 27 mmol hydrogen at 100°–110° F. under agitation at 550 rpm and the catalyst was charged with 300 ml propylene into the reactor. The temperature was raised to 160° F. and maintained for 2 hours yielding 125 grams of polymer having 2.7% by weight hexane solubles.

EXAMPLE II

This Example illustrates the suspension method of preparing magnesium hydrocarbyl carbonate titanium supported catalyst of this invention. Into a one liter glass reactor equipped with magnetic stirrer under an argon atmosphere was added 50 grams magnesium ethoxide (0.437 mols) having an average particle size of about 450 microns in 200 ml hexane. While stirring at room temperature at 400 rpm, carbon dioxide was added until the pressure in the reactor reached 17 psig almost instantaneously. Stirring was continued at room temperature for 24 hours. The magnesium ethyl carbonate having a particle size of about 30 to 100 microns was washed 2 times with 250 ml portions of hexane.

The magnesium ethyl carbonate was added to a one liter reactor containing 300 ml hexane at room temperature and stirred at 450 rpm. Seventy ml of 45% diethylaluminum chloride (0.205 mols) in hexane was added dropwise over a period of 15 minutes and stirred for an additional 30 minutes at room temperature and washed 4 times with 250 ml portions of hexane. After the decantation of the supernatant from the last wash, 100 ml carbon tetrachloride, 100 ml dichloroethane and 12 ml ethyl benzoate (0.0837 mols) was added to the reactor containing magnesium ethyl carbonate while stirring at 450 r.p.m. Two hundred ml titanium tetrachloride (1.82 mols) was added dropwise over a period of 1 hour while the temperature was raised to 185° F. The reactor was then vented to 1 psig. Propylene was admitted into the reactor until the pressure reached 10 psig to initiate a first prepolymerization. The pressure dropped to 5 psig after 15 minutes. The temperature was maintained at 185° F. for an additional 90 minutes, followed by cooling to 160° F. within 30 minutes and maintaining the temperature at 160° F. for 22 hours. At the end of this period the reaction product was washed five times with 250 ml portions of hexane. A second prepolymerization with propylene was conducted by adding five ml of 25% by weight triethylaluminum in hexane to the suspension followed by 3.5 grams of propylene while heating at 160° F. and 450 rpm for 15 minutes. The polymerizate was washed with 250 ml of hexane and filtered in a dry box yielding 10 grams of catalyst.

EXAMPLE III

This Example illustrates the suspension method of preparing magnesium hydrocarbyl carbonate supported titanium catalyst of this invention. Into a 450 ml pressure bottle equipped with magnetic stirrer was suspended 20 grams magnesium ethoxide having an average particle size of about 450 microns in a mixture of 100 ml chlorobenzene and 100 ml n-decane. Carbon dioxide under a constant pressure of 30 psig was admitted to the bottle and the suspension was stirred for about 18 hours at 70° F. yielding a very finely divided colloidal suspension.

Into a one-liter jacketed glass autoclave, equipped with a mechanical stirrer, containing 300 ml titanium tetrachloride at 8° F. was added dropwise the magnesium hydrocarbyl carbonate colloidal suspension prepared in the preceding paragraph over a period of about 60 minutes while stirring at 500 rpm. The temperature was increased to 230° F. over a period of 3 hours and then maintained at 230° F. for an additional hour. Agitation was terminated and after the solid settled, the supernatant liquid was decanted. After 300 ml titanium tetrachloride was added, the temperature was adjusted to 230° F. A solution of 8 ml di-n-butylphthalate in 20 ml hexane was added and the agitation was continued for 2 hours at 230° F. The supernatant liquid was again decanted off and the solid washed 10 times with hot (230° F.) 250 ml portions n-decane, transferred to a bottle, filtered and washed in the dry box 4 times with hexane. The dried solid magnesium hydrocarbyl carbonate supported titanium (Example III, Product A) analyzed as follows: 21.4% by weight di-n-butylphthalate, 1.93% by weight titanium, 49.9% by weight chlorine and 15.9% by weight magnesium. The solid was resuspended in 300 ml titanium tetrachloride at 70° F. and the temperature was then increased to 230° F. and maintained for 12 hours. The product was washed 3 times with hot (230° F.) 250 ml portions of hexane, transferred to the dry box and filtered to dry. Fifteen grams of light green catalytic solid (Example III, Product B) was produced which analyzed as follows: 19.6% by weight di-n-butylphthalate, 2.94% by weight titanium, 53.2% by weight chlorine, and 15.7% by weight magnesium.

EXAMPLE IV

This Example illustrates the suspension method of preparing magnesium hydrocarbyl carbonate supported titanium catalyst of this invention. Into a one-liter jacketed glass autoclave was transferred a suspension of 25 grams magnesium ethoxide having an average particle size of about 450 microns in 300 ml chlorobenzene. The composition was heated from room temperature to 230° F. under mechanical agitation while maintaining a constant $CO_2$ pressure of 25 psig. When the temperature reached 230° F. in about 1 hour a suspension of 5 grams phthalic anhydride in 50 ml chlorobenzene was added to the autoclave and heating was continued for an additional 3 hours at 230° F.

The hot (230° F.) magnesium hydrocarbyl carbonate suspension prepared in the preceding paragraph was added dropwise over a period of about 30 minutes to an autoclave containing 300 ml titanium tetrachloride while stirring at 450 rpm and maintaining the temperature of the titanium tetrachloride reaction product at 20° F. At the end of the addition, the temperature was raised to 230° F. over about a 1 hour period, 10 ml di-i-butyl phthalate was added and the 230° F. temperature was maintained for an additional 3 hours. The temperature was then reduced to 160° F. for a period of about 1 hour and held at 160° F. over 18 hours. The solid was allowed to settle and the supernatant decanted. The reaction product was washed twice with hot (215° F.) n-decane and 6 times with hot (200° F.) hexane.

After decanting the liquid from the last wash, 200 ml titanium tetrachloride was added and the reactants were heated at 230° F. for 2 hours under agitation. The supernatant was removed, and the solid was washed 5 times with 250 ml portions of hot (200° F.) hexane per wash. Prepolymerization of the catalytic solid was carried out in the manner described in Example II by adding 5 ml of 25% by weight triethyl aluminum in hexane, 300 ml hexane and 7 grams propylene to the washed supported catalyst. Prepolymerization was carried out for 30 minutes at 120° F. The product was washed twice with hexane yielding 10 grams of product having an analysis of 2.5% by weight polypropylene, 13.7% by weight magnesium, 4.52% by weight titanium, 50.4% by weight chlorine and 0.8% by weight aluminum.

EXAMPLE V

This Example illustrates the suspension method of preparing magnesium hydrocarbyl carbonate supported titanium catalyst of this invention. Into a 450 ml glass pressure bottle was suspended 15 grams magnesium ethoxide having an average particle size of about 450 microns in 250 ml chlorobenzene. The composition was maintained under a constant $CO_2$ pressure of 30 psig for 60 hours at 70° F.

The magnesium hydrocarbyl carbonate suspension prepared in the preceding paragraph was added dropwise over a period of about 60 minutes to an autoclave containing 300 ml titanium tetrachloride while stirring at 550 rpm and maintaining the temperature of the titanium tetrachloride reaction product at 70° F. At the end of the addition, the temperature was raised to 230° F. over about a 1 hour period, 10 ml di-i-butyl phthalate was added dropwise and the 230° F. temperature was maintained for an additional 2 hours. The temperature was then reduced to 170° F. over a period of about 1 hour and held at 170° F. for an additional 1 hour. Two hundred ml hexane was added to the reactor, stirring was stopped and the reactants held at 170° F. for another 18 hours. The solid was allowed to settle and the supernatant decanted. The reaction product was washed four times with hot (230° F.) n-decane and four times with hot (170° F.) hexane. An aliquot (one third of the suspension) was dried and saved (Example V, Product A).

After decanting the liquid from the remaining solids, 200 ml titanium tetrachloride was added and the reactants were heated at 235° F. for 2 hours under agitation. The supernatant was removed, and the solid was washed 2 times with 250 ml portions of hot (210° F.) hexane per wash and 4 times with 250 ml portions of hot (150° F.) hexane per wash. Prepolymerization of the catalytic solid was carried out in the manner described in Example II by adding 5 ml of 25% by weight triethyl aluminum in hexane, 300 ml hexane and 7 grams propylene to the washed supported catalyst. Prepolymerization was carried out for 30 minutes at 120° F. The product was washed twice with hexane yielding 10 grams of product (Example V, Product B) having an analysis of 10.6% by weight magnesium, 5.43% by weight titanium, 44.8% by weight chlorine and 1.3% by weight aluminum.

EXAMPLE VI

This Example illustrates the use of 2-ethylhexanol in the solution route for preparing magnesium hydrocarbyl carbonate supported titanium catalyst of this invention. Into a 450 ml pressure bottle equipped with magnetic stirrer was suspended 25 grams magnesium ethoxide having an average particle size of about 450 microns in 90 ml 2-ethylhexanol. Carbon dioxide under a constant pressure of 25 psig was admitted to the bottle and the contents were stirred for about 18 hours at room temperature yielding a solution. The solution was diluted with 200 ml n-decane and 4 ml ethyl benzoate and stirred for one more hour yielding a clear solution.

Into a one-liter jacketed glass autoclave, equipped with a mechanical stirrer, containing 300 ml titanium tetrachloride at 10° F. was added dropwise 100 ml of the magnesium hydrocarbyl carbonate solution prepared in the preceding paragraph over a period of about 60 minutes while stirring at 450 rpm. The temperature was increased to 235° F. over a period of 3 hours and then maintained at 235° F. for an additional two hours. The temperature was reduced to 170° F. over one hour and held at 170° F. for another hour. Agitation was terminated and after the solid settled, the supernatant liquid was decanted. After 300 ml titanium tetrachloride was added, the temperature was adjusted to 230° F. A solution of 4 ml di-n-butylphthalate in 20 ml hexane was added dropwise and the agitation was continued for 2 hours at 230° F. The reactants were cooled to 170° F. over one hour. The supernatant liquid was again decanted off and the solid washed 5 times with hot (170° F.) 250 ml portions hexane, transferred to a bottle, filtered and dried in the dry box yielding Example VI, Product A. Part of the titanium supported magnesium hydrocarbyl carbonate was prepolymerized in the manner described in Example II by suspending 4 grams of the solid in 20 ml hexane with 1.4 ml of 25% triethylaluminum in hexane, 4 ml diphenyl dimethoxy silane (0.1 mol) and 1.7 grams propylene, agitated for 30 minutes at 140° F. and washing. Analysis of Example VI, Product B showed magnesium was 12.0% by weight, titanium was 5.6% by weight, chlorine was 49% by weight, and aluminum less than 0.5% by weight.

EXAMPLE VII

This Example illustrates the solution method of preparing magnesium hydrocarbyl carbonate supported titanium catalyst of this invention using a mixture of ethanol and hydrocarbon as the suspending medium. Into a 450 ml glass pressure bottle was suspended 15 grams magnesium ethoxide having an average particle size of about 450 microns in 30 ml ethanol and 75 ml n-decane. The composition was stirred at 70° F. for one hour while maintaining a constant $CO_2$ pressure of 25 psig. Four ml ethyl benzoate was added to the clear solution and stirring at 70° F. was continued for an additional 60 hours.

The (70° F.) magnesium hydrocarbyl carbonate solution prepared in the preceding paragraph was added dropwise over a period of about 60 minutes to an autoclave containing 400 ml titanium tetrachloride while stirring at 450 rpm and maintaining the temperature of the titanium tetrachloride reaction product at 32° F. At the end of the addition, the temperature was raised to 230° F. over about 4 hours and the 230° F. temperature was maintained for an additional 2 hours. The temperature was then reduced to 170° F. over a period of about 1 hour, held at 170° F. for 1 hour, the agitation was stopped and temperature maintained at 170° F. for 19 hours. After the solid was allowed to settle and the supernatant decanted, 400 ml titanium tetrachloride was added and the temperature was raised to 230° F. within 15 minutes while stirring at 450 rpm. When the temperature reached 230° F., 3 ml di-i-butyl phthalate in 7 ml hexane was added dropwise. Heating was continued for 2 hours followed by decantation of the solid. The solid was washed six times with 220 ml hot (170° F.) hexane. An aliquot (how much) of the suspension was dried (Example VII, Product A).

Prepolymerization of the catalytic solid was carried out in the manner described in Example II by adding 5 ml of 25% by weight triethyl aluminum in hexane and 7 grams propylene to the washed supported catalyst. Prepolymerization was carried out for 30 minutes at 140° F. The product was washed once and dried (Example VII, Product B).

EXAMPLE VIII

This Example illustrates the use of ethanol in the solution route for preparing magnesium hydrocarbyl carbonate supported titanium catalyst of this invention. Into a 450 ml pressure bottle equipped with magnetic stirrer was suspended 20 grams magnesium ethoxide having an average particle size of about 450 microns in 70 grams absolute ethanol. The composition was held at a constant $CO_2$ pressure of 25 psig for 45 minutes at 70° F. The solution was transferred into a one-liter jacketed autoclave reactor and diluted with 300 ml of a n-decane/hexane solution (3:2 by volume). A solution of 380 ml 25% TEA was added dropwise within one hour under agitation at 70° F. The reactor was then heated to 180° F. and held there for 2 hours. The product was washed five times with 250 ml portions of hexane. The suspension was filtered and dried in the dry box. Yield 37 grams.

A suspension of 20 grams of the solid support catalyst prepared in the preceding paragraph in 100 ml carbon tetrachloride was added to a one-liter jacketed glass autoclave reactor containing 100 ml 1,2-dichloroethane. While agitating at 450 rpm, 200 ml titanium tetrachloride was added dropwise over a 30 minute period. The temperature of the reactor was raised from 70° F. to 230° F. over a period of 1 hour. Five ml di-i-butyl phthalate was added dropwise and heating at 230° F. was continued for 2 more hours. The suspension was cooled at 170° F. over a 1 hour period, the supernatant decanted and the catalytic solid washed 5 times with 250 ml portions of hexane.

EXAMPLE IX

This Example illustrates the use of magnesium hydrocarbyl carbonate supported titanium catalyst components prepared in the preceding examples in the slurry polymerization of propylene. In each case a catalyst was prepared in a 7 ml bomb by adding 2 ml hexane, 20 mg of the titanium supported magnesium hydrocarbyl carbonate prepared in the indicated examples, the indicated molar ratio of triethyl aluminum, the indicated ratio of modifier (2,2',6,6'-tetramethyl piperidine, methyl phenyl dimethoxy silane and diphenyldimethoxy silane). After the 2-liter autoclave equipped with mechanical stirrer was flushed with propylene gas, 670 ml of hexane was added and the temperature adjusted to 110° F. under agitation at 450 rpm. Twenty mg of catalyst was added to the reactor and the reactor was sealed. Eight mmols hydrogen* was added through an inlet port and sufficient propylene added to raise the pressure to 200 psig. The temperature of the autoclave was then raised to 160° F. with the pressure increasing to 250 psig. Propylene was continuously supplied through the inlet port at a rate sufficient to maintain the pressure at 250 psig while maintaining the reactants at 160° F. for 2 hours. Differences in the polymerization procedure are indicated under Remarks in the Table below. In the Table, the following abbreviations are used. MOD is modifier, TEA is triethyl aluminum, MPDMSi is methyl phenyl dimethoxy silane, DPDMSi is diphenyl dimethoxy silane and TMPIP is tetramethyl piperidine.
*(for a melt flow index of 2-4)

TABLE I

| Mg. Component from Example | MOD | Molar Ratio of TEA/MOD/Ti | Yield of Polymer g/g Catalyst | Wt % Hexane Solubles | Remarks |
| --- | --- | --- | --- | --- | --- |
| III A | MPDMSi | 175/8/1 | 7,950 | 1.8 | |
| III A | MPDMSi | 175/8/1 | 11,050 | 1.3 | |
| III B | MPDMSi | 175/8/1 | 11,500 | .17 | |
| III B | MPDMSi | 200/8/1 | 16,950 | .29 | |
| III B | DPDMSi | 237/24/1 | 15,750 | .28 | |
| III B | MPDMSi | 350/16/1 | 10,850 | .9 | |
| III B | MPDMSi | 175/4/1 | 17,550 | .74 | |
| III B | MPDMSi | 175/2/1 | 16,500 | .6 | |
| III B | TMPIP | 247/15.5/1 | 28,600 | .63 | 10 mg of catalyst |
| III B | TMPIP | 247/15.5/1 | 33,500 | .48 | 250 Psig |
| IV | DPDMSi | 115/5.3/1 | 16,000 | 1.4 | Average of 2 runs |
| IV | DPDMSi | 115/5.3/1 | 18,400 | 1.9 | Average of 4 runs Catalyst added at 160° F. |
| IV | DPDMSi | 131/5.3/1 | 15,500 | 2.9 | 10 mg of catalyst |
| V A | MPDMSi | 95/4.3/1 | 10,750 | .92 | |
| V B | MPDMSi | 95/4.3/1 | 14,450 | .78 | |
| V B | MPDMSi | 115/4.3/1 | 15,250 | .9 | |
| V B | MPDMSi | 115/4.3/1 | 12,850 | .88 | Catalyst added at 160° F. |
| VI A | MPDMSi | 95/4.3/1 | 21,500 | 1.8 | |
| VI A | MPDMSi | 95/4.3/1 | 22,400 | 1.2 | 10 mg Catalyst |
| VI B | MPDMSi | 95/4.3/1 | 18,900 | 1.6 | |
| VI B | MPDMSi | 95/4.3/1 | 17,000 | 0.87 | |
| VII A | MPDMSi | 175/8/1 | 13,050 | 1.9 | |
| VII B | MPDMSi | 175/8/1 | 10,250 | 4.0 | |
| VIII | MPDMSi | 175/8/1 | 12,150 | 2.4 | |

In all cases the polymerizate had a relatively low level of fines and the polymerizate was characterized by being a mixture of spherical and oblong particles. The bulk density of the polymerizate ranged from about 17½ to 29 pounds per cubic foot with most being over 25 pounds per cubic foot. The hexane extractables of the polymerizate ranged between 0.6 and 3.0 weight % except for Example VIB where the hexane extractables were 6.4 weight %.

EXAMPLE X

This Example illustrates the use of the magnesium component from Example IIIB in vapor phase polymerization of propylene. The catalyst was prepared in the same manner as that set forth in Example IX using the indicated molar ratios of triethyl aluminum and modifier. The gas phase polymerization apparatus used in this Example is similar to that described in U.S. Pat. No. 4,129,701. The polymerization reactor was a 4" inside diameter pipe sealed at the ends, equipped with a longitudinal agitation shaft having flat agitator blades which sweep a 12" polymer powder bed. There was a disk with a U-shaped cut at the end of the polymer bed which acts as a wier over which the polymer was removed from the reactor through a hole at the end of the reactor behind the wier. Propylene monomer was injected into the reactor through three equally shaped ports above the polymer bed. Cooling coils and heating tape were wrapped around the reactor for temperature control. The reactor was flushed with propylene to about 10 psig at 110° F. under the polymer bed while stirring at 45 rpm. Three ml solution of triethyl aluminum (1 mmolar triethyl aluminum in hexane) and the indicated concentration of silane was added from a bomb connected to a port in the reactor via propylene flush (15 ml liquid propylene), followed by 17 mmols of hydrogen gas. The reactor was pressurized with propylene to 300 psig while the temperature was raised to 160° F. Twenty mg of catalyst IIIB suspended in 3 ml hexane was added from a bomb via propylene flush. After the catalyst addition, polymerization was continued for 2 hours while maintaining the reactor at 300 psig propylene and 160° F.

TABLE II

| MOD | Molar Ratio of TEA/MOD/Ti | Yield of Polymer g/g Catalyst | Wt % Hexane Extractables | Remarks |
| --- | --- | --- | --- | --- |
| DPDMSi | 240/15/1 | 13,080 | .56 | |
| DPDMSi | 240/15/1 | 16,700 | .68 | |
| MPDMSi | 240/20/1 | 13,080 | .91 | 2.1 Hours Polymerization Time |

We claim:

1. A composition comprising a transition metal component and a magnesium hydrocarbyl carbonate support.

2. The composition of claim 1 wherein said transition metal component comprises a titanium (IV) compound.

3. The composition of claim 2 wherein said titanium (IV) compound comprises a titanium (IV) halide.

4. The composition of claim 3 wherein said composition comprises an aluminum alkyl component.

5. A catalyst composition comprising a transition metal component, a Group II or IIIA metal alkyl component and a magnesium hydrocarbyl carbonate support.

6. The composition of claim 5 wherein said transition metal component comprises a titanium (IV) compound.

7. The composition of claim 6 wherein said titanium (IV) compound comprises a titanium (IV) halide.

8. The composition of claim 7 wherein the metal alkyl component comprises an aluminum alkyl component.

9. The process of preparing a composition comprising a transition metal component and a magnesium hydrocarbyl carbonate support which comprises the steps of reacting a suspension comprising magnesium alcoholate with carbon dioxide to form a magnesium hydrocarbyl carbonate and reacting said magnesium hydrocarbyl carbonate with a transition metal component.

10. The process of claim 9 wherein said transition metal component comprises a titanium (IV) halide.

11. The process of claim 9 wherein the suspension comprises an alcohol.

12. The process of claim 9 wherein the alcohol concentration and carbon dioxide concentration are sufficient to form an alcoholic solution comprising magnesium hydrocarbyl carbonate.

13. The process of claim 12 wherein the magnesium hydrocarbyl carbonate is precipitated from the alcoholic solution with at least one member selected from the group consisting of a metal alkyl and a transition metal halide.

14. The process of claim 13 wherein the metal alkyl is an aluminum alkyl and the magnesium hydrocarbyl carbonate is precipitated from the alcoholic solution with an aluminum alkyl before treatment with said transition metal halide.

15. The process of claim 13 wherein the magnesium hydrocarbyl carbonate is precipitated from the alcoholic solution with a titanium (IV) halide.

16. The process of claim 15 wherein the magnesium hydrocarbyl carbonate supported titanium component is treated with at least one aluminum alkyl compound.

17. The process of claim 16 wherein the aluminum alkyl component comprises a dialkylaluminum halide.

18. The process of claim 9 wherein the magnesium alcoholate is suspended in an inert diluent substantially free of alcohol.

19. The process of claim 18 wherein the inert diluent comprises at least one member of the group consisting of liquid hydrocarbon and liquid halohydrocarbon.

20. The process of claim 18 wherein sufficient carbon dioxide is reacted with magnesium alcoholate to reduce the average particle size of the magnesium alcoholate by at least 50%.

21. The process of claim 20 wherein the magnesium hydrocarbyl carbonate is treated with at least one aluminum alkyl compound and at least one transition metal halide.

22. The process of claim 21 wherein the transition metal halide comprises a titanium (IV) halide and at least some of said titanium (IV) halide is contacted with the magnesium hydrocarbyl carbonate before any aluminum alkyl compound.

23. The process of claim 21 wherein the transition metal halide comprises a titanium (IV) halide and at least some of the aluminum alkyl is contacted with the magnesium hydrocarbyl carbonate prior to any titanium (IV) halide.

24. The process of preparing a composition comprising titanium metal component and a magnesium hydrocarbyl carbonate support which comprises the steps of reacting a suspension comprising magnesium ethylate with carbon dioxide to form a composition comprising magnesium ethylcarbonate and reacting said magnesium ethylcarbonate with a transition metal component comprising a titanium (IV) halide.

25. The process of claim 24 wherein the suspension comprises an alcohol.

26. The process of claim 25 wherein the alcohol concentration and carbon dioxide concentration are sufficient to form an alcoholic solution comprising magnesium ethylcarbonate.

27. The process of claim 26 wherein the magnesium hydrocarbyl carbonate support is precipitated from the alcoholic solution with at least one member selected from the group consisting of aluminum alkyl and titanium (IV) halide.

28. The process of claim 26, wherein the alcohol comprises ethanol.

29. The process of claim 26, wherein the alcohol comprises 2-ethylhexanol.

30. The process of claim 26, wherein the alcoholic medium contains an inert diluent.

31. The process of claim 24 wherein the magnesium ethylate is suspended in inert diluent substantially free of alcohol comprising at least one member selected from the group consisting of a hydrocarbon and a halohydrocarbon.

32. The process of claim 24 wherein the magnesium ethylate is suspended in chlorobenzene.

* * * * *